J. C. COOKE.
MACHINE FOR SHARPENING CHISELS, &c.
No. 30,208. Patented Oct. 2, 1860.
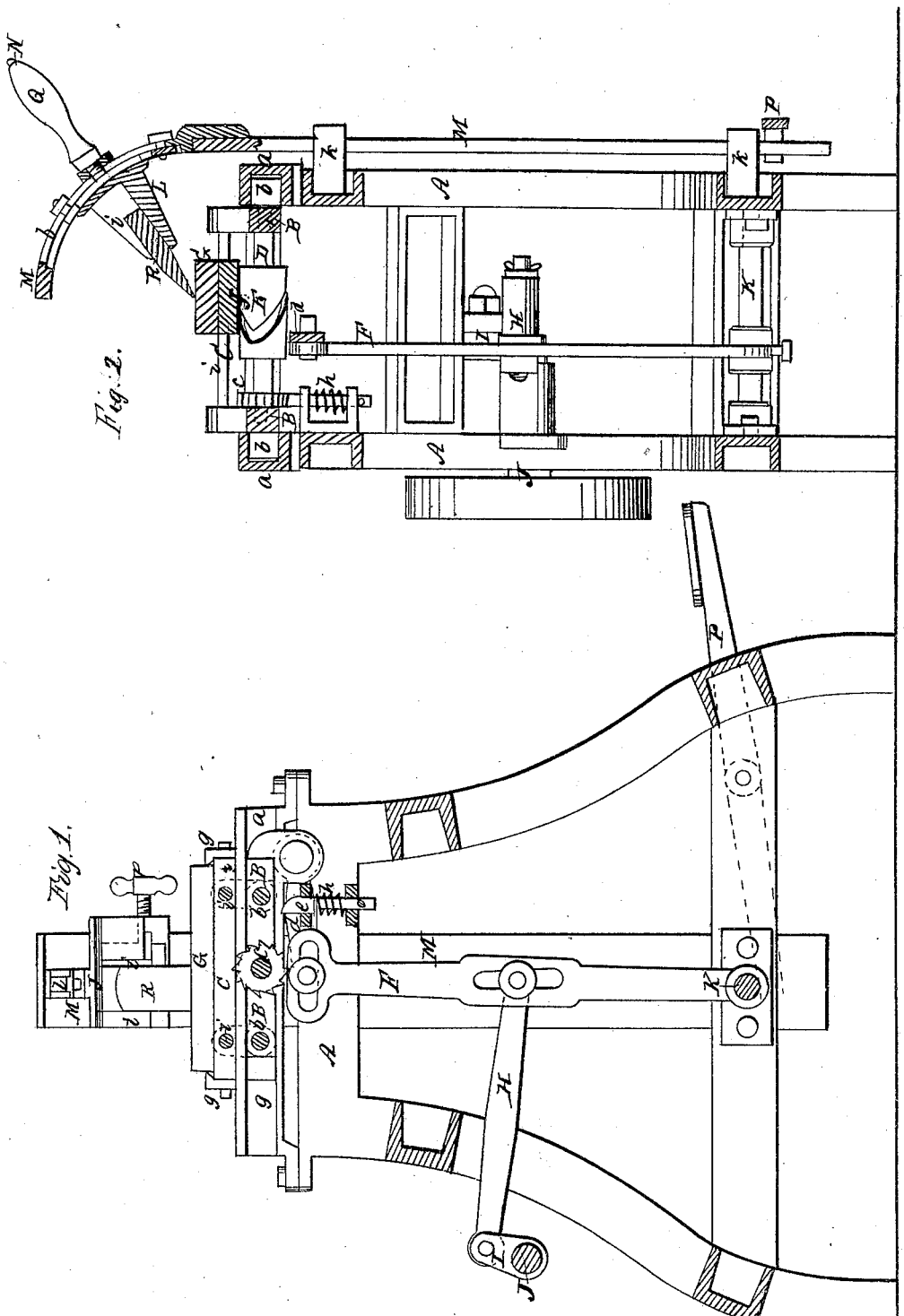
Witnesses
Inventor

UNITED STATES PATENT OFFICE.

JAMES C. COOKE, OF MIDDLETOWN, CONNECTICUT.

MACHINE FOR SHARPENING TOOLS.

Specification of Letters Patent No. 30,208, dated October 2, 1860.

*To all whom it may concern:*

Be it known that I, JAMES COOPER COOKE, of Middletown, in the county of Middlesex and State of Connecticut, have invented a new and Improved Machine for Sharpening Chisels and other Tools; and I do hereby declare that the following is a full, clear, and exact description of the same, reference being had to the accompanying drawing, forming part of this specification, in which—

Figures 1 and 2, are vertical sections of the machine at right angles to each other.

Similar letters of reference indicate corresponding parts in both figures.

My invention consists in a machine whose principal elements are a hone carriage and a tool holder, said carriage having a reciprocating rectilinear motion in a direction parallel or nearly so with the edge of the tool and a gradual or step by step movement in a transverse direction, and the tool holder being applied in a peculiar manner relatively to the said bed so that the tool may rest upon the hone at any required inclination to the face thereof according to the degree of bevel desired.

To enable others to make and use my invention I will proceed to describe its construction and operation.

A, is the framing of the machine having on its top the horizontal ways $a$, $a$, for the reception of the rollers $b$, $b$, which are attached to the hone carriage B. On the top of the hone carriage there are secured two parallel guide bars $i$, $i$, which are arranged at right angles to the ways $a$, $a$, for the purpose of supporting the hone bed C, and guiding the same in its transverse movement. Below, midway between, and parallel with these guide bars, there is arranged in suitable bearings in the said carriage a shaft D, carrying a grooved barrel cam E, whose groove receives a stud $f$, projecting from the bottom of the hone bed C; and near one end, this shaft has secured to it a ratchet wheel $c$. The hone G, rests upon the bed C, and is secured thereto by dogs $g$, $g$, at its ends. The carriage B, is connected by a link $d$, with the upper end of a long arm F, which is secured to a rock shaft working in bearings in the lower part of the framing. This arm is connected by a rod H, with a crank I, on the main shaft J, of the machine which has rotary motion imparted to it by any suitable means, and the said crank by its revolution gives a swinging motion to the arm F, which gives the carriage B, a reciprocating rectilinear movement along the ways $a$, $a$. Every time the carriage moves in one direction a tooth of the ratchet wheel $c$, on the cam shaft D, is acted upon by a dog $e$, attached to the interior of the framing in such manner as to produce part of a revolution of the said shaft and cam and by the action of the cam upon the stud $f$, a slight transverse movement of the hone bed and hone, but as the carriage moves in the opposite direction, the dog $e$, which is beveled at one side and held up by a light spring $h$, is pushed out of the way by the ratchet wheel without the latter being turned back.

L, $i$, $j$, $p$, is the tool holder composed of a stock L, with a fixed clamping piece $i$, a movable clamping piece $j$, and a set screw $p$, applied to operate upon the piece $j$, for securing the tool R. The stock L is secured to a bar M, the upper part of which is curved in the form of an arc of a circle and the lower part of which is straight. The straight portion of the said bar is fitted to slide longitudinally in a vertical direction in fixed guides $k$, $k$, attached to the outside of the framing A, at one side of the hone carriage B, and the upper arc formed portion is arranged to bend over the said carriage and the bed C. The head of the stock L, is fitted to the inner concave side of the arc formed portion of the bar M, and the said stock is secured to the said bar by a screw N, and nut Q, the said screw being firmly secured in the head of the stock and passing through a slot $l$, in the arc formed portion of the bar M, and the said nut being fitted to the said screw outside of the bar and being made of suitable form to enable it to be grasped like a handle for the purpose of turning it and for the purpose of moving the tool stock up and down the arc formed portion of the said bar, for the purpose of varying the inclination of the tool to the face of the hone according to the degree of bevel required for the edge. The lower end of the bar M, is connected with a treadle P, attached to one side of the framing for the purpose of enabling the said bar and the tool stock and tool to be raised up to permit the adjustment of the tool and stock.

The operation of the machine is as follows. The tool having been adjusted and secured in the stock and the stock having been properly adjusted and secured to the bar M, the tool is allowed to rest upon the hone in contact with which it is held by its own weight aided by the weight of the stock and of the bar M. On the main shaft J, being set in motion the hone is carried back and forth along the edge of the tool by the reciprocating movement of the carriage B, and by that means is sharpened; and as the hone in addition to this movement receives the gradual or step by step transverse movement produced on the bed C, by the cam E, every part of its face is in its turn brought into operation and consequently the whole face is made to wear almost uniformly.

This machine has been more especially intended for the sharpening of chisels and the tool represented in the machine by the drawing is a chisel but it may be adapted to the sharpening of other kinds of tools by a suitable modification of the tool holder and its appendages.

What I claim as my invention, and desire to secure by Letters Patent, is—

The combination of the reciprocating carriage B, and the transversely moving hone bed C, with the tool stock L, by means of a bar M, applied and having the tool stock fitted to it substantially as and for the purpose herein described.

JAMES COOPER COOKE.

Witnesses:
WALDO P. VINAL,
GILES W. DART.